United States Patent [19]

Soot et al.

[11] 4,450,134

[45] May 22, 1984

[54] METHOD AND APPARATUS FOR HANDLING NUCLEAR FUEL ELEMENTS

[76] Inventors: Olaf Soot, 9 Tomahawk La., Greenwich, Conn. 06830; Alexander H. McPhee, 89 The Waterway, Plandome Heights, N.Y. 11030

[21] Appl. No.: 291,466

[22] Filed: Aug. 12, 1981

Related U.S. Application Data

[63] Continuation-in-part of Ser. No. 056,061, Jul. 9, 1981, abandoned.

[51] Int. Cl.³ .............................................. G21C 19/20
[52] U.S. Cl. .................................... 376/262; 376/203; 376/272
[58] Field of Search ................. 376/260, 262, 272, 203

[56] References Cited

U.S. PATENT DOCUMENTS

| | | | |
|---|---|---|---|
| 3,143,479 | 8/1964 | Hargo et al. | 376/262 |
| 3,765,549 | 10/1973 | Jones | 376/272 |
| 3,935,062 | 1/1976 | Keller et al. | 376/272 |
| 4,055,508 | 10/1977 | Yoli et al. | 376/272 |
| 4,056,435 | 11/1977 | Carlier et al. | 376/262 |
| 4,069,923 | 1/1978 | Blumenau et al. | 376/272 |
| 4,123,323 | 10/1978 | Weber et al. | 376/272 |

FOREIGN PATENT DOCUMENTS

| | | | |
|---|---|---|---|
| 2246637 | 3/1974 | Fed. Rep. of Germany | 376/272 |
| 2528825 | 12/1976 | Fed. Rep. of Germany | 376/272 |
| 2431752 | 2/1980 | France | 376/272 |
| 445661 | 2/1968 | Switzerland | 376/272 |

Primary Examiner—Sal Cangialosi
Attorney, Agent, or Firm—Frank J. Thompson

[57] ABSTRACT

An improved method and apparatus for transferring nuclear fuel elements between a fluid-filled storage pool and a cask is disclosed. The cask is supported within and is restrained by a tank which is transported between terminal locations of a nuclear facility. Transfer of fuel elements between a storage pool and the cask is accomplished by coupling the tank to a port of the pool. The transporter accurately positions and restrains the tank during transfer. In a preferred embodiment, the cask tank is unweighted from the transporter during transfer and is advanced into a fluid-sealed engagement with a port surface of the pool. In an alternative arrangement, the cask tank remains supported on the transport during its transfer and lifting means mutually engaging the transporter and tank advance the tank toward the port surface for establishing a coupling between the port and the cask. The method and apparatus substantially reduce fluid contact with an exterior surface of the cask during transfer and potential nuclear contamination; they enhance the protection of the transfer apparatus against seismic disturbances; and, they accomodate casks of different sizes.

20 Claims, 13 Drawing Figures

METHOD AND APPARATUS FOR HANDLING NUCLEAR FUEL ELEMENTS

This is a continuation-in-part of 06/056,061 filed July 9, 1981, now abandoned.

BACKGROUND OF THE INVENTION

1. Field of the Invention

This invention relates to the transfer of nuclear fuel between storage pools and shipping casks. More particularly, the invention relates to an improved method and apparatus which substantially reduces the probability of nuclear contamination during the transfer of nuclear fuel elements between a fluid-filled storage pool and a shipping cask.

2. Description of the Prior Art

In the operation of nuclear reactors, a controlled nuclear chain reaction is maintained in a reactor core by fuel elements containing radioactive uranium. Typically, these elements comprise long, thin, tubular structures made of steel, clad with a zirconium alloy and within which are packed a number of pellets containing a radioactive uranium composition. The fuel elements which can be efficiently utilized for extended periods of time eventually fail due to reduced activity or physical integrity. The resulting spent fuel elements must then be removed and replaced to assure safe, efficient reactor operation.

After removal from the reactor core, the spent fuel elements are generally transferred to a fluid-filled fuel storage pool for retention pending shipment to a disposal or recycling facility. Similarly, fresh fuel elements can be stored in fluid-filled pools after shipment to the nuclear reactor location but prior to their placement in the core. Spent fuel elements are typically shipped from one point to another in sealed, fluid-filled, shielded containers called casks. Transfer of the fuel elements from the pool to the casks, and from the casks to the pool, must usually be done without removing the fuel from the fluid, using constantly-filtered water, to assure maximum safety. However, the art has experienced substantial difficulty in safely and efficiently effecting such transfer. Water employed in the pool or gas or air surrounding the spent fuel will be contaminated regardless of precautions taken. Moreover, even if a system were designed to have essentially zero contamination in the environment, prudence would still dictate treating it as if it were contaminated to guard against possible anomalies in the system.

Among the early prior art transfer systems were those which immersed the cask in the pool to allow transfer without removing the fuel from the water. There were many risks attendant with such transfer systems, not the least of which was the total wetting of the cask exterior with contaminated water. The contaminated wash water produced had to be disposed of.

Faced with this problem of cask contamination, there have evolved a number of systems for effecting transfer without wholly immersing the cask. These systems have come to be known as dry cask systems. Unfortunately, known dry cask systems have exhibited various drawbacks.

For example, U.S. Pat. No. 3,765,549 presents a system employing a pair of independently-actuatable, concentric bellows mounted beneath a fuel storage pool and circumscribing a hatch therein. According to that disclosure, a fuel cask is positioned directly below the hatch and the bellows are extended downwardly to seat against the cask and form a transfer channel between the pool and the cask. The channel is then flooded, the hatch opened, and transfer effected. The particular arrangement of bellows and supporting devices shown, however, render the system susceptible to serious losses of contaminated material in the event the cask to bellows sealing surfaces do not match perfectly or if the cask sealing surface becomes dirty or damaged in transportation. This system does not provide secondary means for preventing leakage and is susceptible to leakage in the event of moderate seismic disturbances.

In an attempt at overcoming certain of the difficulties of the bellows arrangements, U.S. Pat. No. 3,910,006 discloses that a direct contact between a cask and the underside of a transfer pool can be employed. This arrangement is said to eliminate the problems associated with large differential pressures on the bellows and the large amounts of water that the bellows arrangements must employ in the transfer channel. Here again different casks with different fabrication tolerances have to be matched with sealing surfaces beneath the fuel transfer pool and leakage cannot be prevented if casks do not properly match the surface or if their sealing surfaces become dirty or damaged in transportation. This system does not provide a secondary means for preventing leakage and is also susceptible to leakage in the event of a moderate seismic disturbance.

In U.S. Pat. No. 3,883,012 there is described yet another dry cask system. In particular it is disclosed that the fuel cask can be positioned within a tank to accommodate casks of varying dimensions and to avoid some of the risks that might still surround the use of systems such as that described in U.S. Pat. No. 3,765,549. While this disclosure suggests lateral seismic restraints on the cask tank, no means are identified for suitably positioning the cask transporter and for restraining the cask tank while at the loading terminal.

The art has thus evolved fuel transfer systems culminating in a number of dry cask systems. There remains however, a need for a dry cask system which permits safe and efficient transfer of nuclear fuel elements between casks and fluid-filled storage pools.

SUMMARY OF THE INVENTION

It is an object of the present invention to provide an improved method and apparatus for safely and efficiently transferring nuclear fuel elements between storage pools and dry casks.

It is a further and more specific object of the invention to provide an improved method and apparatus for effecting transfer of nuclear fuel elements between storage pools and dry casks supported within cask tanks which are transported between transfer stations and decontamination stations by means which also provide effective sealing between a fuel transfer pool and a cask tank, accurate repeat positioning of the system and seismic restraint during transfer operations.

Another object of this invention is to provide a novel port hatch means for efficient transfer and maximum safety from seismic disturbances.

It is another object of this invention to provide an improved dry cask method and apparatus for transferring nuclear fuel elements between a storage pool and a dry cask positioned within a cask tank wherein the cask tank is advanced into mating contact with an undersurface of the storage pool.

Yet another object of this invention is to provide an improved dry cask method and apparatus for transferring nuclear fuel elements between a storage pool and a cask positioned within a tank wherein the tank is advanced into engagement with a surface of the storage pool and the weights of the cask, the cask tank and a column of water in the transfer pool is removed from a transport means and is supported by a lift means on a transfer corridor floor.

The method of the invention in one aspect comprises the steps of supporting and restraining a nuclear fuel element transfer cask in a tank which is supported upon a transport means at a first terminal location; advancing the transport means and supported tank to a second terminal location adjacent a port of a nuclear fuel or transfer pool; supporting and restraining the tank at the second terminal location; establishing a fluid-sealed channel between the port and an interior of the cask; flooding the sealed channel; providing access between the fuel storage pool and the cask through the port; and, transferring fuel elements between the cask and the pool.

In accordance with another feature of the method of the invention, the tank is advanced into engagement with a surface of a transfer pool port, and is restrained in contact with the surface. A preferred embodiment of the invention provides for unweighting the tank from the transport means.

Yet another object of this invention is the provision of an improved method and apparatus for transferring nuclear fuel elements between a storage pool and dry cask supported within a cask tank, wherein paired bellows arrangements have nuclear shielding material positioned therebetween.

It is yet another object of this invention to provide an improved method and apparatus for transferring nuclear fuel elements between storage pools and dry casks supported within cask tanks wherein novel bellows arrangements are efficiently engaged in sealing contact.

An apparatus in accordance with the invention for transferring nuclear fuel elements between a fluid-filled storage pool and a fuel element cask, including a tank transport means for supporting and advancing a cask tank between a first terminal location and a second terminal location adjacent a port in a fuel transfer pool. A cask tank means is provided for supporting and restraining the cask within the tank during transport and transfer and for protecting the cask from contamination during the transfer. A port closure means operable between a closed position for sealing the port in the pool, and an open position for enabling the passage of fuel elements between the fuel transfer pool and the cask interior is also provided along with a means for coupling the tank to the fuel transfer pool and for restraining the tank.

In a preferred embodiment of the apparatus of the invention, a means is provided for unweighting the cask tank from the transport means at the second location and for advancing a surface of the tank into engagement with a transfer pool port surface and for restraining the tank in engagement with the surface. An alternative embodiment of the apparatus provides means for supporting the cask tank on the transport means and for advancing the cask tank into engagement with the port surface. Other features of the apparatus provide for restraining and accurately positioning the transport means and means integral with the transport means for restraining the tank.

In still other alternative embodiments of the invention, the cask tank is supported on the transport means at the second location and extensible coupling means are provided for coupling between the tank and the port. Other features of the apparatus provide for restraining and accurately positioning the transport means and means integral with the transport means for restraining the tank.

BRIEF DESCRIPTION OF THE DRAWINGS

These and other objects and features of the invention will become apparent with reference to the following specification and to the drawings wherein.

DETAILED DESCRIPTION

The method and apparatus of this invention enables spent fuel to be removed from a spent fuel storage pool and to be loaded into a spent fuel shipping cask for removal from a nuclear plant. It will be appreciated that the method and apparatus of the invention can also be employed for transferring fuel from the cask to the pool. Moreover, the type of facility, whether it be a nuclear power plant, a nuclear fuel processing plant or other facility requiring transfer of fuel elements, is not of importance to this invention which has utility wherever cask pool transfer systems are required. Accordingly, the following description, referring to transfer of spent fuel from a pool to a cask, must be taken as illustrative and not limiting of the invention.

Figure 1:
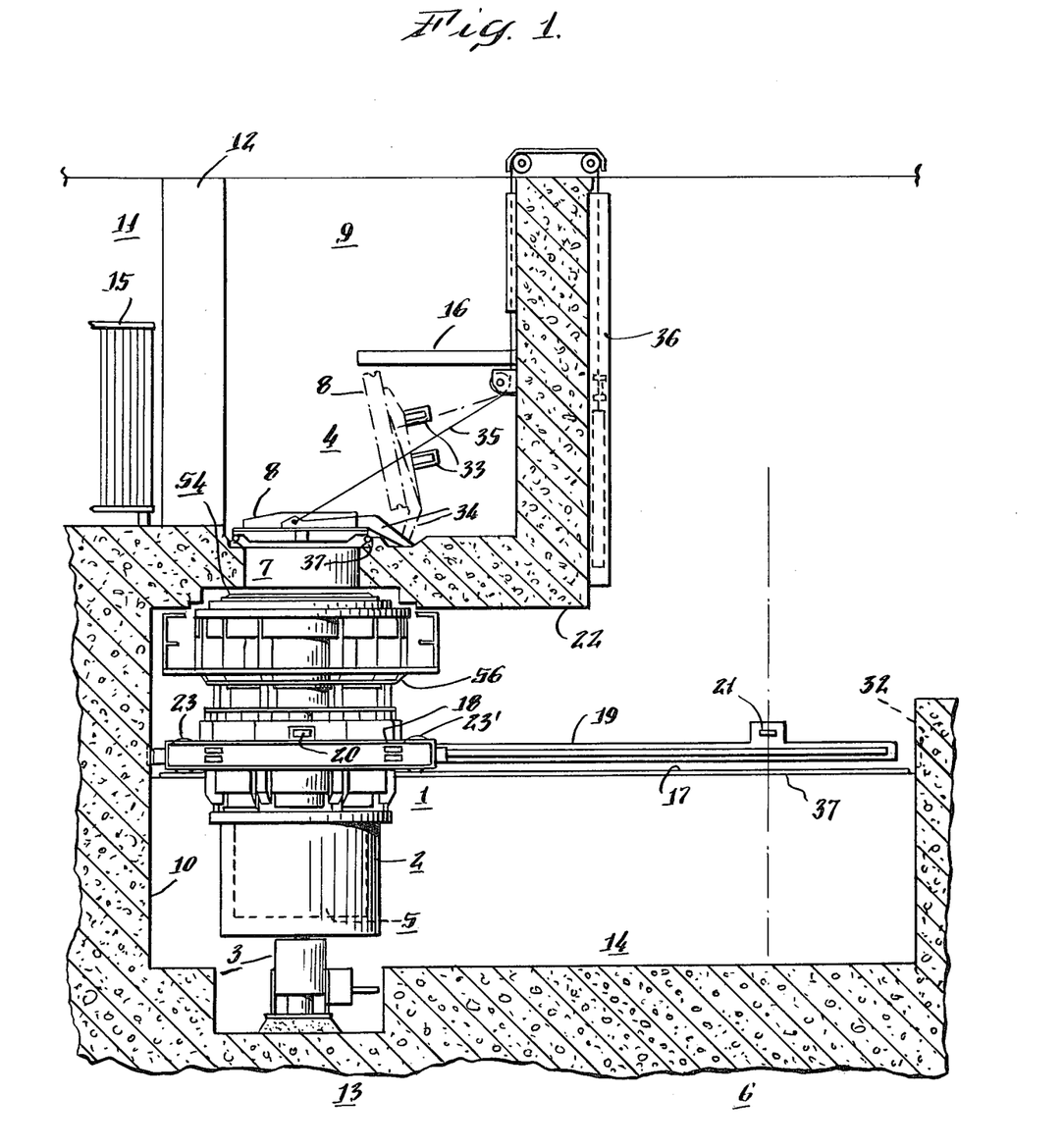
FIG. 1 is a fragmentary, elevation view, partly broken away and partly in section of a nuclear fuel handling building illustrating a dry cask handling apparatus of this invention which is engaged in a transfer position.
Figure 2:
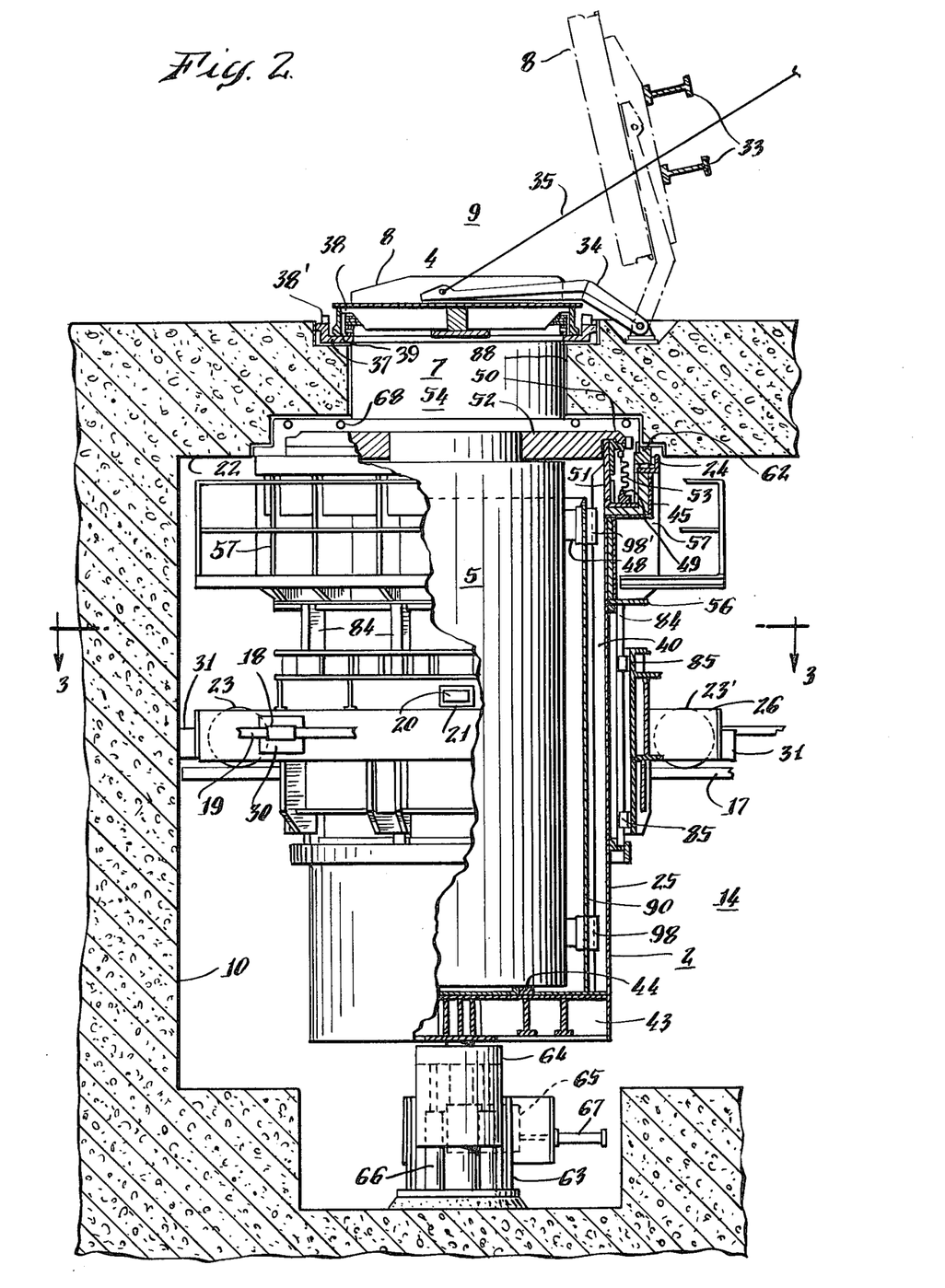
FIG. 2 is an enlarged side elevational view, partly in section and partly broken away, showing in greater detail the dry cask handling apparatus of FIG. 1.

Referring now to FIGS. 1 & 2, one embodiment of the apparatus of the invention is shown in position to effect transfer of fuel elements. The apparatus comprises a cask 5, a cask tank transport means 1, a cask tank means 2, cask tank lifting and support means 3, a port closure means 4. Controls for sequentially actuating the various devices and mechanisms disclosed herein can be freely adapted from known techniques depending upon the particular timing and sequencing desired. The cask tank means 2 is supported and guided on the cask tank transport means 1, when not connected to fuel transfer pool 9, and houses the fuel cask 5. In operation for fuel element removal, an empty cask 5 is positioned in the cask tank means 2 at a first decontamination terminal location 6. The transport means 1 advances the tank means to a second terminal location 13 beneath a pool port 7 at an opposite end of a transfer corridor 14. The lifting and supporting means 3 then lifts the tank 2 to port 7 and supports it at this position as shown on FIGS. 1 & 2, and cask tank 2 is sealed to port 7 near its top portion. At this location, an interspace 54 between the interior of cask 5 and the port 7 below a port closure cover 8 is flooded. The cover 8 is then raised as shown in FIG. 1 to permit transfer of fuel elements from a fuel transfer pool 9 to the cask 5.

FIG. 1, which is a fragmentary view of a building 10 of a nuclear fuel handling facility, illustrates a fuel storage pool 11, the transfer pool 9, and a transfer canal 12. The transport means 1 and tank means 2 are shown positioned at the second terminal location 13 which is a fuel element loading terminal of the facility. The cask tank 2 is supported by lifting means 3 and sealed to port 7 near the top part of cask tank 2. The port closure means 4 is shown in both closed and opened positions. The dry cask handling apparatus is thus shown conditioned for a fuel element transfer operation.

Fuel racks 15 are located within the fuel storage pool 11 vertically supporting fuel assemblies (not shown) submerged in a fluid, as for example water, which fills the pool. Adjacent to the fuel storage pool 11 is the fuel transfer pool 9 connected thereto by the fuel transfer canal 12 having provision for the installation and removal of canal gates (not shown) to permit the movement of fuel assemblies between the storage and transfer pools by means of a fuel handling machine (not shown), typically a crane. Within the fuel transfer pool 9 can be a cask head storage ledge 16. At the bottom of the transfer pool 9 is the port 7 which communicates with the transfer corridor 14 below. The cask tank means 2 is shown laterally restrained by the transport means 1 directly below the port 7 and vertically supported by lift means 3.

Figure 3:
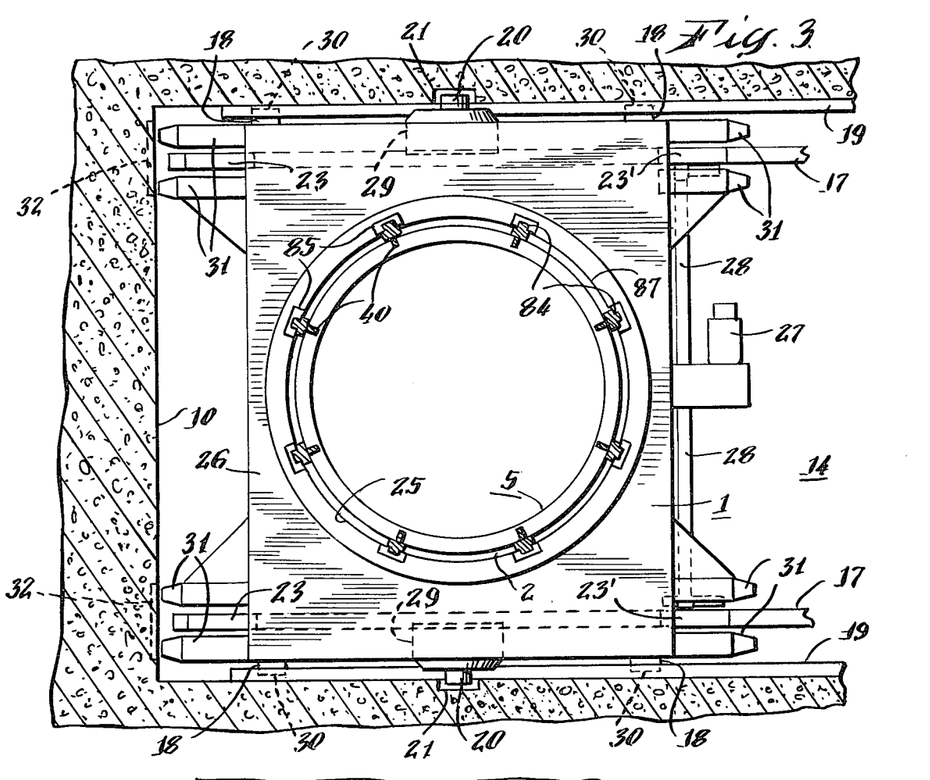
FIG. 3 is a view taken along line 3—3 of FIG. 2 illustrating means for supporting the cask in an aperture provided in a transport means.

The transport means 1 of FIGS. 1, 2, and 3 includes means for accurately positioning the cask tank beneath the port and for providing horizontal and vertical transport restraint. The transport means 1 is shown locked to the walls of the building 10 at the terminal location 13 on transport rails 17 on which it travels. Transport side guide shoes 18 (FIGS. 2 & 3) are shown bearing against transport side guide rails 19 which, as shown partly broken away for clarity, are fixed to the building walls on opposite sides of the corridor 14. This arrangement accurately positions the cask tank beneath the port 7 and restrains the lateral movement of the transport means 1. Transport lock bars 20 are provided and have tapered entrance ends which enable them to enter sockets 21 even when slightly out of alignment and force the transport means into accurate alignment with port 7. Lock bars 20 are shown extended in their locking position in which they engage lock bar sockets 21 formed in opposite walls at the first and second terminal locations 6 and 13 respectively. In FIG. 1, a socket 21 is illustrated on the distant wall of the terminal location 6. The lock bars 20, when extended into the lock bar sockets 21 on both sides of corridor 14, not only accurately position the transport means at each of the terminals 6 and 13, but they also restrain horizontal movement in a direction parallel to rails 17.

The cask tank means 2 is lifted to an elevated position as shown in FIG. 2, by lift means 3. The cask tank top flange 24 is then engaged with and sealed to an embedment seal ring 62.

A means is provided for guiding vertical movement of the cask tank means 2 through the transport frame 26 and comprises a plurality of guide rails 84 mounted to the outside of the cask tank 2 which engage guide shoes 85 (FIG. 3) mounted to the transport frame 26. After the transport means is accurately positioned at the terminal location 13 as was described hereinbefore, the cask tank 2 is raised by the lifting means 3. The guide rails 84 and guide shoes 85 maintain accurate positioning of the cask tank 2 as it is raised and assure that the tank top flange 24 engages the embedment seal ring 62 to establish a seal. Alternative to the guide rails and shoes, a cylindrical guide body, such as body 284, shown on FIG. 8, mounted to or used with cask tank 2 can be used to guide vertical movement of the tank. When the cask tank top flange is disengaged at the loading terminal 13, and at all other positions, from embedment seal ring 62, the cask tank means 2 is lowered to the transport 1 and is supported by its flange 56 in contact with the transport frame 26.

A feature of the dry cask handling apparatus embodiment of FIG. 2 is the unweighting of the cask tank means 2 from the transport means 1. When the cask tank means 2 is coupled to the embedment seal ring 62, all of the vertical load is supported by lift means 3 at terminal location 13. The height of water in fuel transfer pool 9 is supported by cask tank means 2 in addition to the weight of the internally positioned cask 5. In the embodiment of FIG. 2, this entire loading is transferred directly to the floor slab through the lift means 3. As a result, the transport means 1 is structurally designed to support and transport only the weight of cask 5 and cask tank means 2 but not the weight of the column of water at terminal location 13. The transport means can accordingly be made lighter in weight and therefore is less costly. Because of the support by the lift means 3, the apparatus of the embodiment of FIG. 2 is substantially rigid; its natural frequency is high, and the seismic loads which are related to natural frequency of the system are therefore low. At terminal 13 the transporter supports the cask tank means 2 against lateral loads through the guide rails 84 and the guide shoes 85. These lateral loads are transferred to the building walls through transport side guide shoes 18, transport side guide rails 19 in a first direction, and through transport lock bars 20 in a second direction. Cask tank top flange 24 and lift means 3 can be used, in addition to transport 1 to support lateral loads if so desired. Lift means 3 supports all vertical loads when the port cover 8 is open and cask tank means 2 is subjected to high loads from the head of water in fuel transfer pool 9.

Figures 10, 12:
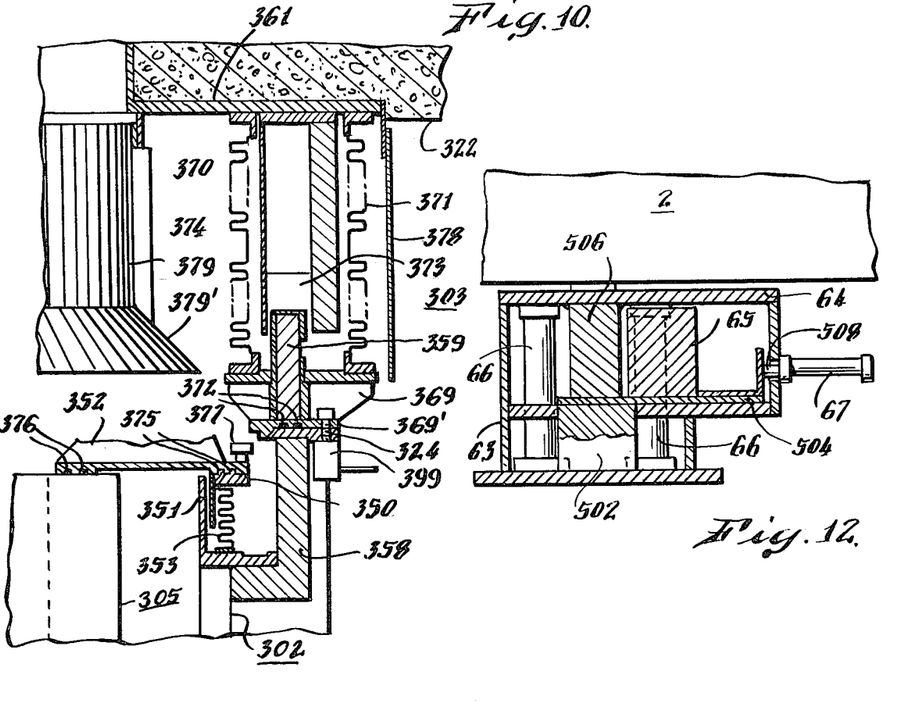
FIG. 10 is a fragmentary, enlarged, cross-sectional view of one embodiment of a coupling means used with the apparatus of FIG. 9.
FIGS. 12 & 13 are fragmentary, enlarged, cross-sectional views of a lift means used with the apparatus of FIG. 1 illustrating the lift means in retracted and extended positions respectively.

Lift means 3, shown in FIGS. 1–2, 12–13 comprises a lift base structure 63 having a support 502, a lifting head 64, support block 506 mounted as by welding to the head 64 for vertical movement therewith, hydraulic lift cylinders 66, a lift lock block 65 supported on a slide plate 504, a plate actuating piston 508 and actuating cylinder 67, a hydraulic power unit (not shown) and controls (not shown). FIG. 12 illustrates the lift in a retracted position. During a lifting sequence, the lifting head 64 is raised by hydraulic cylinders 66 mounted on lift base structure 63. The lifting head 64 is horizontally guided and restrained by guide shoes (not shown) also mounted on lift base structure 63. When the lifting head 64 is raised to its high position, the guide plate 504 and the lift lock block 65 supported thereon are advanced under block 506 of the lifting head 64 by the lift lock actuating cylinder 67. Following this, the support block of lifting head 64 is lowered on to the lift lock block 65. All of the vertical loads applied to cask tank means 2 are then supported on blocks 65,506, and support 502. No cask tank means 2 vertical loads are then carried by the transport means 1 or by hydraulic cylinders 66 during fuel element transfer.

Figure 13:
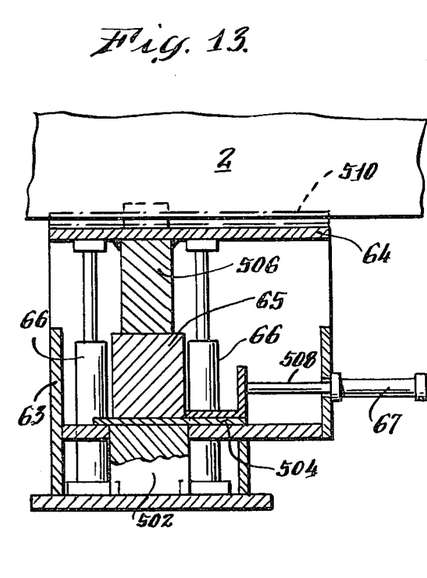

The lowering sequence of lifting head 64 starts with initially raising the lifting head 64, a short distance to unload block 65 as shown by the dashed lines in FIG. 13 withdrawing the guide plate 504 and lift lock block 65 by actuating cylinder 67 and then lowering the lifting head 64 by hydraulic cylinders 66 until cask tank mean 2 is lowered to the transport means 1 and is supported by its flange 56 in contact with the transport frame 26. The lifting head 64 is further lowered to provide adequate clearance from cask tank means 2.

Alternatively, the lifting means comprises an arrangement (not shown) having a single hydraulic piston-cylinder which is centrally located under the cask tank subsystem 2. When a hydraulic piston-cylinder assembly is provided for accomplishing vertical movement of the cask tank 2, means are provided for mechanically locking the piston in a raised position to inhibit lowering of the cask tank subsystem, in the event that hydraulic pressure is interrupted during fuel transfer.

As a further alternative, mechanical lifting jacks for providing the necessary vertical upward force and movement can comprise a plurality of conventional, self-locking, screw jacks which are driven simultaneously by a common motor (not shown) through suitable shafting and gear boxes.

When the cask tank means 2 of FIGS. 1 and 2 is lowered by lift means 3 from an elevated position, it decouples from port 7 and engagement with embedment seal 62 is interrupted. The tank 2 which is positioned in an aperture 87 (FIG. 3) of the transporter frame 26 is guided during descent by the plurality of guide rails 84 extending from an outer surface 25 of the tank and by the guide shoes 85 which are mounted to the transporter frame. As shown in FIG. 2, the tank 2 is provided with an annular support flange 56 and a plurality of structural ribs 57. The flange and ribs are mounted to an outer surfaces 25 of the tank. The annular support flange 56 engages and supports the tank on the transporter frame 26.

The transporter means includes transport wheels 23 and 23' which support the transport frame 26 and engage and travel on rails 17. These rails are mounted to wall ledges 37 of the building 10. Wheels 23' are traction wheels and are driven by a motor and gearing 27 (FIG. 3) which is fitted with a spring applied magnetically-released, or equivalent brake. A driving force is transmitted to the wheels by drive shafts 28. The traction wheel drive is similar to the drive of a conventional overhead crane bridge or trolley except that provision is made in the electrical control to magnetically release the brake while the motor is de-energized and the locking bars 20 are being driven into their respective socket 21. A suitable control is provided to assure that the brake on the motor 27 is released when the locking bars 20 are engaging the sockets 21. Each locking bar is actuated by a suitable mechanism 29 such as a jack screw or hydraulic or pneumatic cylinder, which mechanism also provides means for guiding and supporting the locking bar throughout its movement.

Restraint of the transport means 1 is provided against horizontal movement in a direction perpendicular to the side guide rails 19 as previously described, and also against vertical upward movement by means of horizontal guide shoe surfaces 30 which bear against the bottom of the side guide rails 19. Buffers 31 on both ends of the transport frame 26 are shown and adapted to engage buffer plates 32 which are mounted at end walls of corridor 14 at each terminal. The buffers 31 are provided to dissipate the energy of the moving transport means and its supported loads and thereby absorb the shock of inadvertant overtravel at either terminal 6 or 13. The buffers are alternatively hydraulic or mechanical and, in the case of overtravel, strike buffer plates 32 which are fixed to the end walls of corridor 14 at both terminals.

In the embodiment of FIG. 2, the cask 5 is supported within the cask tank means 2 by a cask support adaptor 90. Cask supporter adaptor 90 is described in detail hereinafter with respect to FIGS. 5, 6 and 7. Cask supporter adaptor 90 can be used when a relatively quick internal change of the cask tank means 2 is required, as, for example, to receive a cask 5 of relatively larger or smaller dimension. Alternatively, other means comprising separate cask bottom support structure and separate upper guide plates can be utilized.

Figure 4:
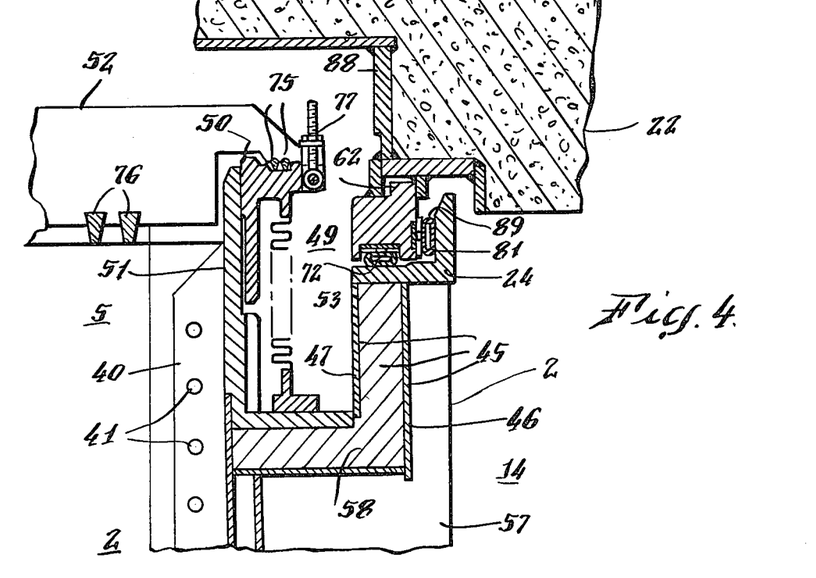
FIG. 4 is a fragmentary, enlarged cross-sectional view of a coupling means used with the apparatus of FIGS. 2 and 8.
Figure 8:
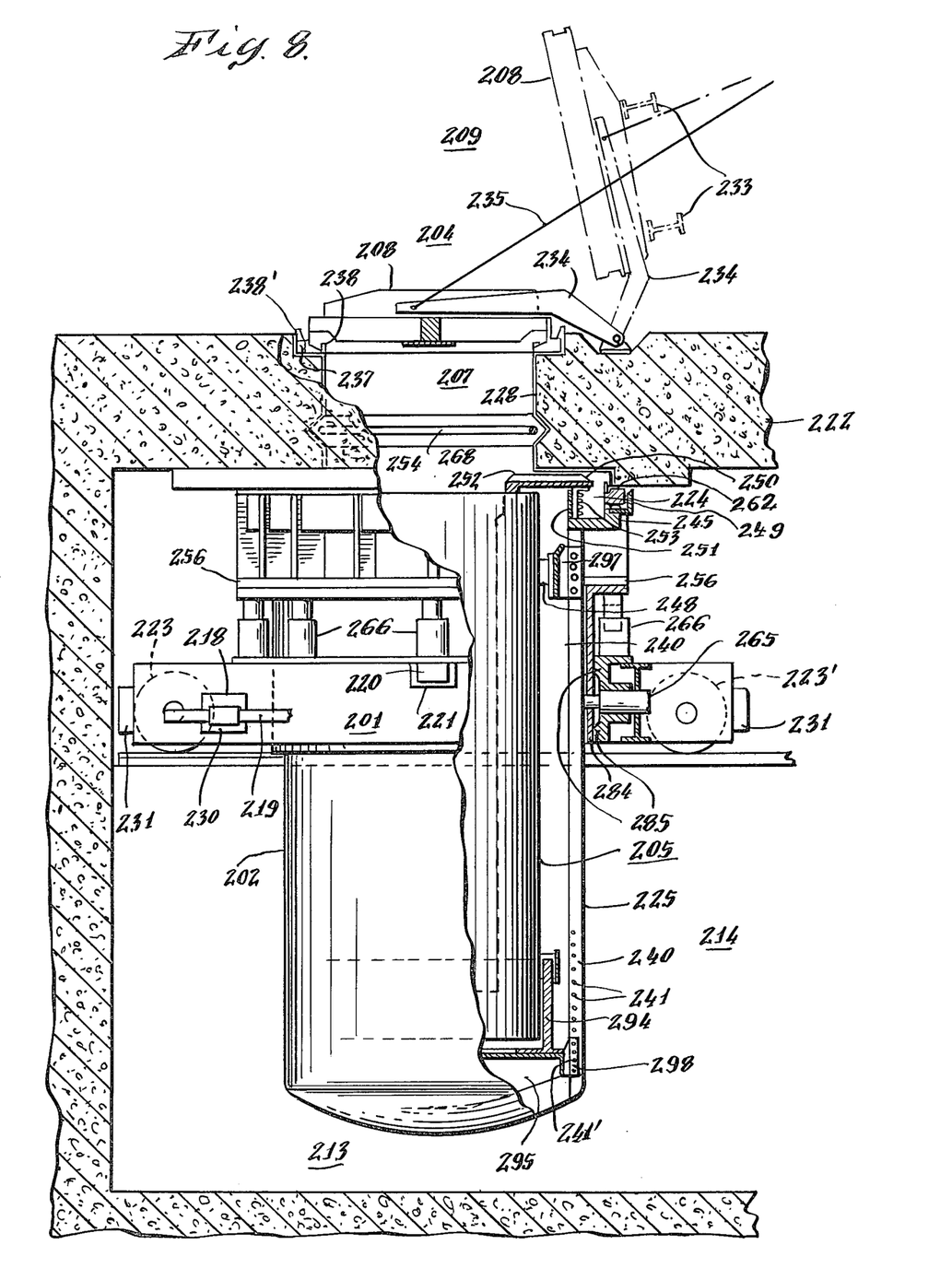
FIG. 8 is a side elevation view, partly in section and partly broken away of an alternative embodiment of the dry cask handling apparatus of FIG. 1.

FIG. 4 is an enlarged view illustrating in detail one embodiment of the cask top sealing details used with the embodiments of the dry cask handling apparatus of FIGS. 1, 2, and 8. The embedment seal ring 62 is annular and is shown mounted by welding below ceiling 22 of corridor 14 to plate members of port embedment 88. A pair of annular inflatable seals 72 and 89 for sealing the cask tank means 2 to the bottom of port 7 are mounted to embedment seal ring 62 and engage tank top flange 24 thus providing a waterproof seal between the tank and port 7. Mounting of seals 72 and 89 to horizontal and vertical faces respectively of the seal ring is provided by suitable adhesives such as an epoxy resin or by other mechanical engaging means. The seals 72 and 89 are separately actuated, in a preferred embodiment, by air pressure after the cask tank means 2 has completed its engaging vertical movement and the cask tank top flange 24 is engaged to embedment seal ring 62.

Cask tank top flange 24 is mounted near a periphery of a top segment of the cask tank means 2. When it is advanced vertically upward it closely engages the embedment seal ring 62. Cask tank top flange 24 also restrains movement of the upper segment of the cask tank means. The cask tank top flange 24 comprises an annular shaped angle body having a vertically extending surface 81 and an integral, transversely extending surface 82 which with seals 72 and 89, seal and establish a fluid sealing engagement.

An annular gutter 49 extends about the periphery of the top flange segment of the cask tank means 2. A wall 45 of the gutter 49 is of double wall construction having plate wall members 46 and 47 and an annular core of radiation shielding material 58 positioned between the wall members.

The gutter 49 also provides a low point from which water in the interspace 54 and in the port 7 below the port closed over (FIG. 12) can be drained after the fuel transfer operation is completed and the port cover 8 is closed and sealed to the floor of the transfer pool 9.

The inside wall 51 of the annular gutter 49 serves to provide mounting space for a guided adaptor ring 50 which is slideably mounted in contact with the inner circular wall 51 of the gutter 49 to permit vertical movement of an adaptor plate 52 to accommodate slight variations in the heights of similar fuel casks 5. The guided adaptor ring 50 is sealed to the bottom of the annular gutter 49 by means of a flexible bellows 53 which enables vertical movement of the adaptor plate 52 while sealing the space between cask and tank against leakage.

The adaptor plate 52 is positioned on top of guided adaptor ring 50 and seals are provided in order to prevent the entry of water into an annular space between the outside of fuel cask 5 and the inside of cask tank means 2. The adaptor plate 52 is shown sealed to the guided adaptor ring 50 by means of annular seals 75. It is similarly sealed to a surface of a segment of the top of cask 5 by seals 76. A clamping force between the adaptor plate 52 and the guided adaptor ring 50 is provided by a plurality of swing bolts 77 fastened to the guided adaptor ring 50. A separate adaptor plate 52 is required for different types of casks to accommodate differing end constructions.

In FIGS. 1 and 2 a novel port closure means 4 of this invention is shown in detail. The port closure means 4 provides an effective fluid seal in a closed position, is readily disengaged to an open position, and is restrained in the open position. In FIGS. 1 and 2, the cover 8 is shown in dotted lines in an open position, and in solid lines in a closed position. Referring to FIG. 1, the port closure means 4 which forms a fluid and leak proof seal between fuel transfer pool 9 and the corridor 14 is shown in its open position with port cover 8 tensioned against backstop beams 33. The port closure means 4 includes the port cover 8 mounted to a pivot arm 34 which rotates about a pivot bearing and support fixed to the transfer pool floor, the lifting cables 35, port cover actuator 36, and port cover base 37 which is recessed in the transfer pool floor about port opening 7. In FIG. 2, concentric protective rings 38 and 38' are shown which serve to protect a sealing surface 39 of the port cover base 37 from impact by objects which could distort the seal surface and disable sealing engagement with port cover base 37. The inner protective ring 38 is a circular ring proportioned to absorb the energy of a heavy falling object and is positioned with respect to port cover base sealing surface 39 at a location which enables the seals to engage a bottom surface of the closed port cover 8. The outer protective ring 38' is similarly located outwardly with respect to port cover sealing surface 39 for enabling engagement with the bottom seals of the cover 8 and above an optional vertical inflatable seal (not shown) which seals against the vertical outside cylindrical surface of the closed port cover 8. Protective rings 38 and 38' are provided with passages for draining pool water into interspace 54. Backstop beams 33, as shown in the fuel transfer pool 9, are mounted to and supported by the sidewalls of the transfer pool. They provide a restraint against which the port cover 8 is held and seismically restrained in an open position by the tensioned cable 35.

A circular header pipe 68 is positioned in the port 7. The header pipe includes a plurality of spray apertures or orifices (not shown) arrayed for directing an effluent thereof into interspace 54. The purpose of the header pipe is to spray wash water into the interspace 54 on an underside of the cover 8 and all other internal surfaces which may become contaminated with radioactive particulates during the transfer of fuel assemblies through the port 7 and interspace 54.

Figure 5:
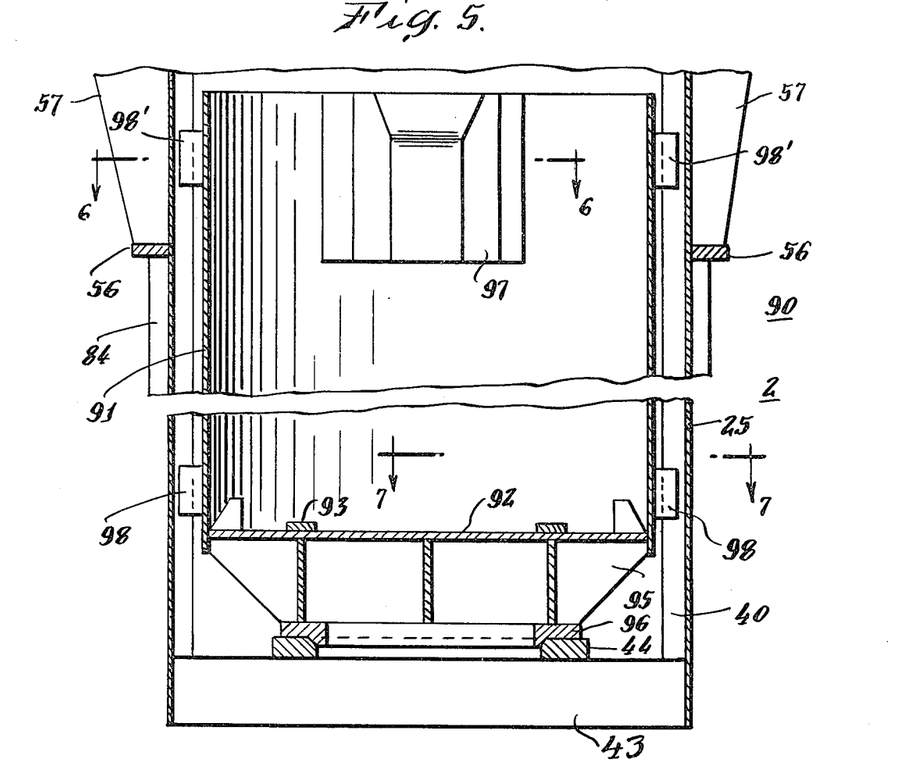
FIG. 5 is a side elevation view in section of a tank means used with the apparatus of FIG. 2 and illustrating a cask adapter.
Figure 6:
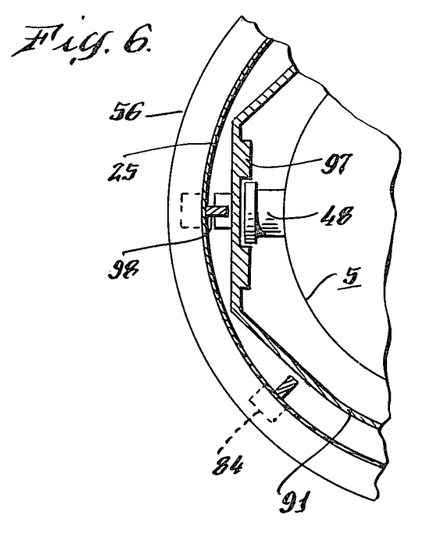
FIG. 6 is a fragmentary view of an upper section of the tank of FIG. 5 taken along line 6—6 of FIG. 5 and illustrating means for restraining an upper end of the fuel cask within the cask tank.
Figure 7:
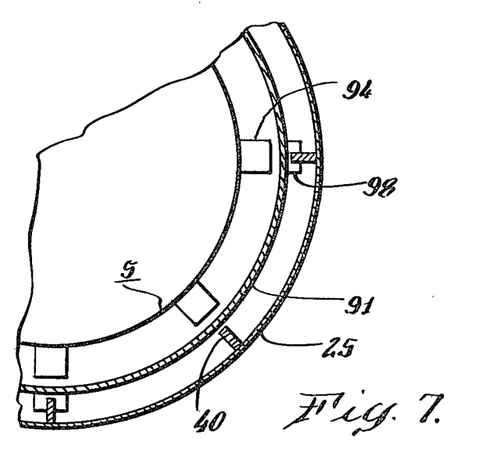
FIG. 7 is a fragmentary view of a lower section of the tank of FIG. 5 taken along line 7—7 of FIG. 5 and illustrating a means for supporting and restraining a lower end of the fuel cask within the cask tank.

FIGS. 5, 6, and 7 illustrate a cask support adaptor 90, previously shown in FIG. 2. FIG. 5 is a vertical cross-section view of cask support adaptor 90. FIG. 6 is a cross-section taken at line 6—6. FIG. 7 is a cross-section taken at line 7—7. This cask support adaptor comprises a cylindrical shell 91 having a plurality of lower and upper guide shoes 98 and 98' respectively, which engage internal, elongated, vertical extending ribs 40 of cask tank means 2 and guide and restrain the cask adaptor 90 within cask tank. The cask adaptor includes a vertical support bottom ring 96 which engages a cask tank base ring 44 positioned on cask tank base 43. Beveled surfaces between the vertical surfaces of adaptor bottom ring 96 and cask tank base ring 44 are provided to accurately position the bottom of cask support adaptor 90 in the cask tank means 2 and to support the cask support adaptor base against lateral loads. The adaptor bottom ring 96 is connected to cylindrical shell 91 by the means of an adaptor base structure 95 and adaptor base plate 92. The cask is vertically supported within cask support adaptor 90 by cask support ring 93, which is part of adaptor base plate 92. Additional horizontal support for the bottom of a cask (not shown) positioned within the adaptor is provided by lateral radially extending supports 94 which are adjustable in a radial direction and are fastened to adaptor base plate 92. For clarity in FIG. 5, the fuel cask 5 is not shown but is shown in FIGS. 6 and 7.

FIG. 5 also illustrates upper, elongated guide plates 97 at opposite chordal positions located at the top of cask support adaptor 90. These guide plates position the top of the fuel cask 5 and restrain horizontal movement of the top of the fuel cask 5 in all horizontal directions. Upper guide plates 97 are provided with converging entry surfaces to facilitate entry of fuel cask trunnions 48 when a fuel cask 5 is introduced into the adaptor by lowering into the adaptor 90.

A separate cask support adaptor 90 is required for each size and construction of fuel cask 5. The outer dimensions, guide shoes 98 and 98', and adaptor bottom ring 96 are substantially the same for all cask support adaptors. The height of adaptor base structure 95 will vary in accordance with the height of a particular cask. The adaptor base plate 92, cask support ring 93, supports 94 and upper guide plates 97 are selected to accommodate the weight, geometry and other physical requirements of a particular cask. Apertures and cutouts in cylindrical shell 91 and base plate 92 serve to reduce the weight of the cask support adaptor 90 and to enable any collected liquids to drain directly into the cask tank means 2.

The function of a one piece cask support adaptor 90 is to provide quick conversion capability for a dry cask handling apparatus wherein a variety of sizes of fuel casks are are to be handled within a short period of time. Such would be the case in a spent fuel storage or reprocessing facility where different sizes of casks are shipped from different nuclear power generating stations. When quick conversion capability for accommodating different types of spent fuel casks is not needed, as would be the case in nuclear generating stations wherein a single size of cask may be used for fuel element removal over a long period of time, a separate cask bottom support and structure, comprising bottom ring 96, structure 95, base plate 92, cask support ring 93, and radial supports 94 can be used in conjunction with separate upper guide plates 97 without the use of the cylindrical shell 91 and without the guide shoes 98 and 98'. In this case, both separate supports can be bolted to cask tank ribs 40, to cask tank base structure 43, and to cask tank base ring 44.

FIG. 8 illustrates an alternative embodiment of the dry cask handling system of this invention. According to FIG. 8, the cask tank means is supported by the transport means and is restrained against movement in all horizontal directions, but is free to be raised on the transport or lowered onto it. In FIG. 8, members are numbered between 201 and 300. As with the description of FIGS. 1, 2, 3 and 4, all members performing functions similar to those previously described bear the same last two digits. The cask tank means 202 is supported on the transport means 201 and is raised and lowered by a force applied to a flange 256. This is accomplished in one embodiment by use of a cylindrical body 284 to which a cask tank mounting flange 256 is mounted. The body 284 is raised by a plurality of hydraulic or mechanical jacks 266 spaced and supported on the top of the transport frame 226. Body 266 is guided during vertical movement by a plurality of guide shoes 285 about the body. A plurality of lock pins 265 are shown extending into apertures in the body 284 when the cask tank means 202 is at a fully elevated position at the loading terminal 213. In this raised position, the cask tank top flange 224 engages the embedment seal ring 262 and the seal between them is effected. This ceiling coupling is shown in greater detail in FIG. 4, which was described hereinbefore.

The cask tank means 202 includes means positioned within the cask tank for supporting and restraining casks of varying dimensions. In FIG. 8, the cask tank means 202 is shown to include a plurality of elongated internal ribs 240 which are provided with spaced holes 241. The spaced holes provide for incremental vertical adjustment of the cask base 295 which supports the fuel cask 205.

Cask supports 294 are fastened to the base to support the lower end of cask 205 laterally and/or vertically. A plurality of connecting shoes 298 are spaced around the periphery of the cask base 295 and are each provided with a plurality of holes 241' to match the holes 241 in the vertical ribs 240 to provide incremental vertical adjustment of the cask base 295 within the cask tank to permit utilization of fuel casks of different heights. While the particular embodiment shown employs vertically spaced holes, it will be apparent to those skilled in the art that any suitable means for cooperatively engaging the ribs and the connecting shoes can be employed. Inside the upper end of the cask tank means 202 are also shown adjustable supports 297 for laterally supporting the upper end or trunnions 248 for the fuel cask 205 from the vertical ribs 240. The vertical ribs 240, in combination with the cask support base 295, the upper support means 297 and the means for engaging them provide effective lateral restraint of the cask 205 within the cask tank means 202.

Figure 9:
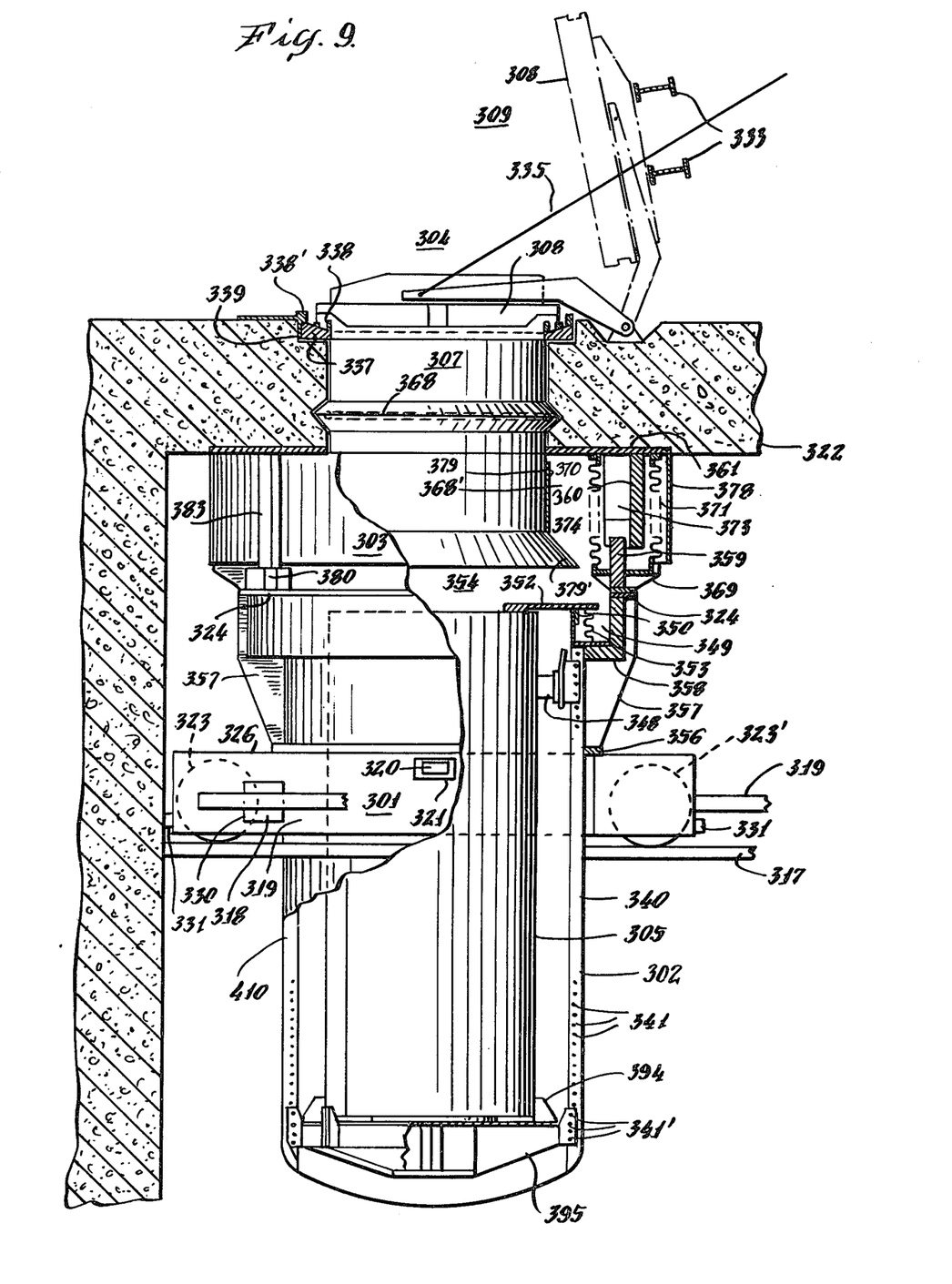
FIG. 9 is a side elevational view, partly in section and partly broken away of an alternative embodiment of the dry cask handling apparatus of FIG. 1 illustrating an extensible coupling means for coupling the tank and the port.

FIG. 9 illustrates yet another embodiment of the dry cask handling apparatus of this invention. According to FIG. 9, the cask tank 302 is fastened to transport means 301 and is restrained against movement in vertical and horizontal directions by the transport means. In FIG. 9, members are numbered between 301 and 400. As with the description of FIGS. 1, 2, 3, 4, and 8, all members performing functions similar to those described bear the same last two digits. The cask tank means 302 is bolted to transport means 301 and is connected to the transfer pool 309 by coupling means 303.

An embodiment of the coupling means 303 shown in FIG. 9 comprises an extensible sealing means. The extensible sealing means includes a lower connecting flange 369 integral with a movable shielding ring 359, which can be raised or lowered to provide clearance for advancing the cask tank means 302 horizontally during its transport.

A bottom surface of the lower flange is provided with seals, described in more detail hereinafter with respect to FIG. 10 for fluid sealing flange 369 to the cask tank top flange 324.

An extensible means is mounted on a top surface of the lower connecting flange 369. This extensible means comprises concentric, annular flexible bellows 370 and 371 which are mounted and sealed at upper ends thereof to a port bottom plate 361 location in the ceiling 322 of the corridor 314. Flexible bellows 370 provides a primary, inner seal against leakage of water from the interspace 354. Flexible bellows 371 provides a secondary outer seal for redundance. In addition it, in combination with flange 369, plate 361 and bellows 370 and 371 provides an annular air tight chamber 373 in the space between the bellows 370 and 371. The lower connecting flange 369 is raised and lowered by the application of vacuum or air pressure, respectively, to the chamber 373.

Radiation shielding is provided with the coupling means 303. Within the annular chamber 373 is a stationary nuclear radiation shielding ring 360 which is mounted to and suspended from port plate 361. This shielding ring overlaps the movable radiation shielding ring 359 and, with radiation shielding ring 358 on the cask tank 302 forms a continuous radiation shield above the top of fuel cask 305.

Within the annular chamber 373 is also positioned a cylindrical plate 374 supported from plate 361 and located in close proximity to the inner bellows 370. The purpose of cylindrical plate 374 is to prevent the bellows from expanding excessively in a radial direction in the event of an inner bellows failure. A similar cylindrical plate 378 is shown in close proximity to the outside of outer bellows 371 for a similar purpose and in addition to protect the outer bellows 371 from damage by contact by external objects.

Positioned radially inside the bellows 370 and forming a vertical extension of the port 307 is a cylindrically shaped protective barrier 379 having a conically shaped distal segment 379'. The barrier 379 protects the bellows 370 from impact by and resulting damage from objects passing through the interspace 354.

A circular header pipe 368 is positioned in the port 307. The header pipe includes a plurality of spray apertures or orifices (not shown) arrayed for directing an effluent thereof into port 307. The purpose of the header pipe is to spray wash water into the interspace 354, on the underside of the cover 308 and all other internal surfaces which may become contaminated with radioactive particulates during the transfer of fuel assemblies through the port 307 and interspace 354. A similar circular header pipe 368' is positioned in an annular space between the inner bellows 370 and the protective barrier 379 for washing surfaces which are not reached and washed by a spray of header pipe 368.

During vertical movement of the extensible coupling means 303 the flange 369 is guided by a plurality of guide shoes 380 which are mounted to the flange and engage a plurality of guide rails 383. The guide rails 383 are affixed to and suspended from ceiling 322. This guiding means, comprising guide shoes 380 and guide rails 383 accurately positions the flange 369 and restrains it against horizontal movement. This guiding means also includes upper and lower stops, (not shown), for limiting vertical travel of the flange 369.

FIG. 10 illustrates in greater detail the embodiment of the coupling means 303 described above. In FIG. 10, annular compression seals 372 are shown positioned on a flange plate 369' on the flange 369 of cask tank 302. The flange plate 369' is maintained in contact with the flange 324 and the seals are compressed and rendered functional by the weight of movable members of the coupling means 303. A sealing force exerted between the flange plate 369' and flange 324 can be supplemented by introducing compressed air into the annular chamber 373. During engagement, the sealing force is maintained and is supplemented by a plurality of latch bolts 399. These bolts maintain the flange 324 and flange plate 369' in engagement in the event of seismic or other forces tending to separate them.

The adaptor plate 352 is shown sealed to the guided adaptor ring 350 by means of annular seals 375. It is similarly sealed to a surface of a segment of the top of cask 305 by seals 376. A clamping force between the adaptor plate 352 and the guided adaptor ring 350 is provided by a plurality of swing bolts 377 fastened to the guided adaptor ring 350.

Disengagement of the flange 369 and the flange 324 is effected by releasing air pressure and applying a vacuum to the annular chamber 373. A means (not shown) is provided for securing the flange 369 at an elevated position, when the coupling means 303 is disengaged from the tank means 302.

Figure 11:
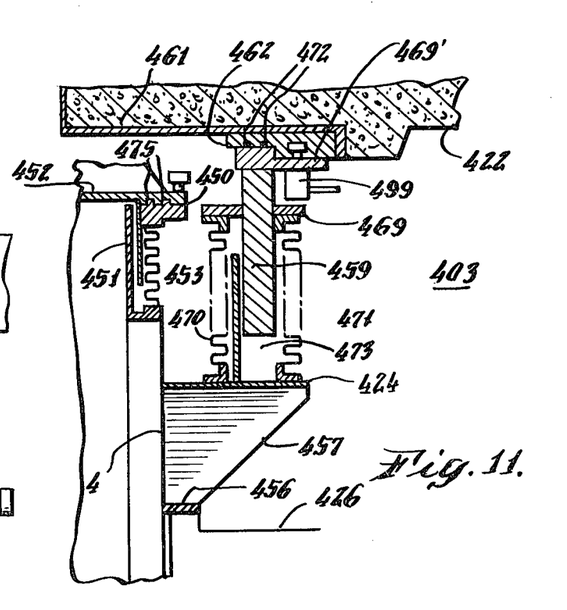
FIG. 11 is a fragmentary, enlarged, cross-sectional view of an alternative embodiment of a coupling means for use with the apparatus of FIG. 9.

Referring now to FIG. 11, there is shown another embodiment of the coupling means 303 according to the present invention. Whereas in FIGS. 9 and 10, the extensible coupling means 303 was mounted to the ceiling 322 and was extensible to engage flange 324 of the tank 302 the arrangement of FIG. 11 provides for mounting the coupling means to a tank 402 and it is extensible therefrom to engage a plate 462 secured to the ceiling 422.

In FIG. 11, the members of the coupling means 403 are numbered between 400 and 500. Those members which perform functions similar to functions performed by members previously described, bear the same last two digits. Bellows 470 and 471 are shown mounted to a horizontal flange plate 424 on cask tank 402 and move with the cask tank means 402 during transport. A flange 469' is shown in engagement with a sealing flange plate 462 which is mounted to the port embedment plate 461 and is provided with seals 472. The connecting flange 469 is raised and its compression against sealing flange plate 462 to effect a fluid seal is accomplished by introducing compressed air into the annular chamber 473 between bellows 470 and 471. Lowering of the flange 469 to disengage the coupling means 403 is effected by venting the annular chamber 473 to atmosphere and allowing the upper connecting flange 469 to lower by gravity. During engagement the coupling force established by air pressure is supplemented by a plurality of latch bolts 499. These bolts maintain flange plate 469' in engagement with sealing flange plate 462 in the event of loss of air pressure in chamber 473 or the occurrence of seismic forces tending to separate them.

An improved method and apparatus for the handling of nuclear fuel elements has thus been described. The method and apparatus are advantageous in reducing the possibility of contamination of a cask surface by fluid flowing from a nuclear fuel storage pool. The apparatus is further advantageous in that it provides substantial restraint of a fuel element cask with respect to seismic forces. Other features and advantages described hereinbefore include adaptable tank means for receiving and restraining fuel casks of various sizes. The cost of the apparatus for handling fuel casks of different sizes is thereby reduced. By unweighting a cask tank from its transport means and supporting and seismically restraining the tank in a vertical direction from a floor bed of a building structure, the forces normally imposed upon the transport means, not only in supporting the tank and its enclosed cask, but also the loads established by a hydraulic head of a storage pool, enables the transport means to be substantially lighter, less complex, less costly and more reliable. The transport means advantageously includes means for establishing lateral seismic restraints on the tank and in an alternative embodiment supports the tank during fuel transfer. In one particular embodiment, the tank is elevated from the transport means into engagement with a port plate and in another particular embodiment, an extensible means is provided for coupling between the tank and the port. Overall, the method and apparatus provide for enhanced safety of operation as well as reduced complexity and cost.

While there have been described particular embodiments of the invention, it will be appreciated by those skilled in the art that variations may be made thereto without departing from the spirit of the invention and the scope of the appended claims.

What is claimed is:

1. An improved method for transferring nuclear elements between a fluid storage pool and a fuel transfer cask comprising the steps of:
   (a) positioning at a first terminal location a transport having an aperture formed in a frame thereof and a cask tank vertically supported in said aperture on said transport and extending through said aperture;
   (b) introducing and supporting a nuclear fuel element cask into said tank at said first terminal location;
   (c) establishing a fluid sealed barrier between inner and outer surfaces of said cask;
   (d) advancing said transport in a horizontal direction to a second terminal location adjacent an overhead port of a nuclear fuel storage pool;
   (e) advancing said tank in a vertical direction toward said port at said second terminal location;
   (f) supporting said tank in engagement with said port; and,
   (g) establishing a fluid seal between said tank and said port.

2. An improved method for transferring nuclear fuel elements between a fluid filled storage pool and a fuel transfer cask comprising the steps of:
   (a) Positioning at a first terminal location a transport having an aperture formed in a frame thereof and a cask tank vertically supported on said transport and extending through said aperture;
   (b) introducing and supporting a nuclear fuel element cask in said tank at said first terminal location and establishing a fluid sealed barrier between inner and outer surfaces of said cask;
   (c) advancing said transport in a horizontal direction to a second terminal location adjacent an overhead port of a nuclear fuel storage pool;
   (d) aligning said tank with respect to said port;
   (e) coupling said vertically orientated tank to said port and establishing a fluid sealed channel between said port and an interior of said cask;
   (f) flooding said sealed channel;
   (g) providing access between said fuel storage pool and the cask through said port; and,
   (h) transferring fuel elements between the said cask and said pool.

3. The method of claim 2 including the step of guiding the advancement of said tank into engagement with said port.

4. The method of claim 1 wherein said tank is vertically advanced by elevating and unweighting said tank from said transport and supporting said tank from a rigid structure.

5. The method of claim 4 wherein said tank is elevated and unweighted from said transport by applying a lifting force to a lower surface of said tank and supporting said tank at said lower surface.

6. The method of claim 1 wherein said tank is vertically advanced by establishing a lifting force between said tank and said transport means.

7. The method of claim 6 wherein said lifting force is established by a lifting means positioned on said transport means for transport therewith.

8. The method of claim 2 wherein said coupling of said tank to said port is provided by extending a bellows coupling means between said port and said tank.

9. The method of claim 2 including seismically restraining said transport at said second location.

10. An improved method for transferring nuclear fuel elements between a fuel storage pool of a nuclear facility and a nuclear fuel transfer cask comprising the steps of:
   (a) positioning a wheeled transport means which travels on elevated tracks in a corridor between first and second terminal locations of a nuclear facility at a first terminal location, said transport means including a frame defining an aperture formed therein and a cask tank positioned vertically in and extending through said aperture and supported on said transport, said cask tank extending below said transport means;
   (b) lowering a nuclear fuel element cask into said tank at said first terminal location and establishing a fluid sealed barrier between inner and outer surfaces of said cask;
   (c) advancing said transport means, said vertically supported tank and said cask in a horizontal direction to a said second location adjacent an overhead port of said nuclear fuel storage pool;
   (d) unweighting said tank from said transport by vertically advancing said tank into engagement with said port and supporting said tank from beneath by a rigid structure;
   (e) establishing a fluid sealed channel between said port and an interior of said cask;
   (f) flooding the sealed channel;
   (g) actuating a port closure to an open position for establishing clear access through said port between said pool and said cask; and
   (h) transferring fuel elements between said cask and said pool.

11. An improved apparatus for transferring nuclear elements between a fluid storage pool and a fuel transfer cask comprising:
   (a) a transport means adapted for movement in a horizontal direction, said transport means having a frame and an aperture formed in said frame;
   (b) a tank means vertically supported on said transport means and extending through said aperture;
   (c) a nuclear fuel element cask having inner and outer surfaces supported in said tank means;
   (d) means establishing a fluid sealed barrier between inner and outer surface of said cask;
   (e) means for advancing said tank in a vertical direction toward an overhead port at a terminal location;
   (f) means for supporting said tank in engagement with said port; and,
   (g) means for establishing a fluid seal between said tank and said port.

12. An improved apparatus for transferring nuclear fuel elements between a fluid filled storage pool and a fuel transfer cask comprising:
   (a) a transport means adapted for movement in a horizontal direction, said transport means having an aperture formed in a frame thereof;
   (b) a tank means vertically supported on said transport and extending through said aperture;
   (c) a nuclear fuel element cask supported in said tank means;
   (d) means for establishing a fluid sealed barrier between an overhead port and said tank means at a terminal location;
   (e) means for aligning said tank with respect to said overhead port; and,
   (f) means for coupling said vertically orientated tank to said port and for establishing a fluid sealed channel between said port and an interior of said cask.

13. The apparatus of claim 12 including means for guiding the advancement of said tank into engagement with said port.

14. The apparatus of claim 11 including lifting means vertically advancing said tank, unweighting said tank from said transport, and for supporting said tank on a rigid structure.

15. The apparatus of claim 14 wherein said lifting means is positioned for applying a lifting force to a lower surface of said tank.

16. The apparatus of claim 11 wherein said means for vertically advancing said tank establishes a lifting force between said tank and said transport means.

17. The apparatus of claim 16 wherein said lifting means is positioned on said transport means for transport therewith.

18. The apparatus of claim 12 wherein said coupling means includes a bellows extending between said port and said tank.

19. The method of claim 12 including means for seismically restraining said transport means at a terminal location.

20. The apparatus of claim 15 wherein said means for support said tank on a rigid structure supports said tank at said lower surface.

* * * * *

UNITED STATES PATENT AND TRADEMARK OFFICE
CERTIFICATE OF CORRECTION

PATENT NO. : 4,450,134
DATED : May 22, 1984
INVENTOR(S) : Olaf Soot and Alexander H. McPhee It is certified that error appears in the above-identified patent and that said Letters Patent are hereby corrected as shown below:

Title page, left-hand column, line 10 (under heading "Related U.S. Application Data), delete "Jul. 9, 1981," and substitute --Jul. 9, 1979,-- therefor.

Column 1, line 5, delete "July 9, 1981," and substitute -- July 9, 1979, -- therefor.

Signed and Sealed this

Fifth Day of February 1985

[SEAL]

Attest:

DONALD J. QUIGG

Attesting Officer        Acting Commissioner of Patents and Trademarks